United States Patent

[11] 3,553,511

| [72] | Inventors | Robert Hemmings<br>Halesowen;<br>John William Archibald Hunt,<br>Birmingham, England |
|---|---|---|
| [21] | Appl. No. | 799,584 |
| [22] | Filed | Feb. 17, 1969 |
| [45] | Patented | Jan. 5, 1971 |
| [73] | Assignee | Joseph Lucas (Industries) Limited<br>Birmingham, England<br>a British company |
| [32] | Priority | Feb. 23, 1968 |
| [33] | | Great Britain |
| [31] | | No. 8817/68 |

[54] PERMANENT MAGNET ROTOR ASSEMBLY DIRECTLY SECURED ON NON-MAGNETIC SHAFT
4 Claims, 1 Drawing Fig.

[52] U.S. Cl. .................................................. 310/156, 310/90, 310/263
[51] Int. Cl. ................................................. H02k 21/12
[50] Field of Search ........................................ 310/156, 152, 62, 90, 46, 261, 263; 219/136, 148

[56] References Cited
UNITED STATES PATENTS

| 1,579,798 | 4/1926 | Vail.............................. | 310/90 |
| 3,392,294 | 7/1968 | Campbell..................... | 310/263 |
| 3,407,317 | 10/1968 | Honsinger..................... | 310/62 |
| 3,411,027 | 11/1968 | Rosenberg.................... | 310/156 |
| 3,459,980 | 8/1969 | Coroller....................... | 310/156 |

FOREIGN PATENTS

| 972,364 | 10/1964 | Great Britain................ | 310/156 |

*Primary Examiner*—Milton O. Hirshfield
*Assistant Examiner*—R. Skudy
*Attorney*—Holman, Glascock, Downing & Seebold ABSTRACT: In a dynamoelectric machine in which a rotor shaft carries a permanent magnet rotor assembly, the rotor shaft has a pair of bearing portions which are spaced-apart by a central portion of nonmagnetic material. The bearing portions are secured to the central portion, which carries the permanent magnet rotor assembly.

PATENTED JAN 5 1971
3,553,511
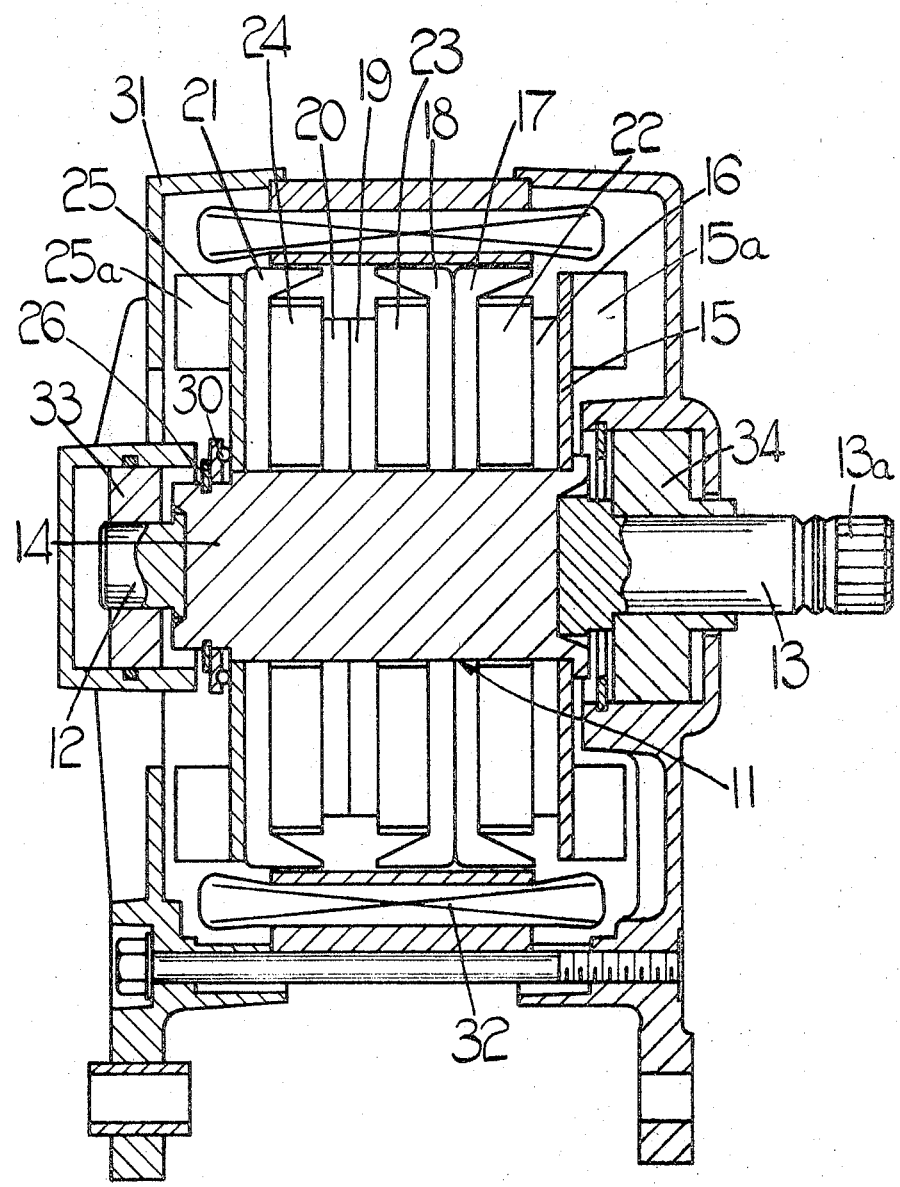
INVENTOR
Robert Hemmings and John William Archibald Hunt
BY Holman, Glasgow, Downing & Seebold
ATTORNEYS

PERMANENT MAGNET ROTOR ASSEMBLY DIRECTLY SECURED ON NON-MAGNETIC SHAFT

This invention relates to dynamoelectric machines of the kind including a rotor shaft carrying a permanent magnet rotor assembly.

The invention resides in a rotor shaft for a dynamoelectric machine of the kind specified, having a pair of bearing portions which are spaced-apart by a separate central portion of nonmagnetic material, said bearing portions being secured to said central portion, and said central portion carrying said permanent magnet rotor assembly in use.

The accompanying drawing is a sectional side view illustrating one example of the invention.

Referring to the drawing the rotor shaft 11 of a dynamo electric machine is formed by friction welding a pair of cylindrical steel-bearing portions to opposite ends of a central, cylindrical aluminum portion, so that the composite rotor shaft has a pair of end, steel, bearing portions 12, 13 which are spaced-apart by a central aluminum portion 14. The shaft 11 supports a permanent magnet rotor assembly including a steel disc 15 which bears against an outwardly extending shoulder at one end of the portion 14, three pairs of interdigitated discs 16 and 17, 18 and 19, and 20 and 21 between which are trapped permanent magnets shown at 22, 23 and 24 respectively, and finally a second steel disc 25 against which bears a resilient washer 30 which seats against an inwardly extending shoulder near the other end of the portion 14, the whole assembly being held in place by a resilient clip 26 engaging a groove in the portion 14. The discs 15 and 25, which in use will constitute north and south poles, are formed respectively with outwardly extending portions 15a and 25a constituting fan blades to draw cooling air through the dynamoelectric machine in use. The machine includes a casing 31 supporting the stator windings 32 and defining bearings 33, 34 for the portions 12, 13 the portion 13 having an extension 13a through the intermediary of which the shaft is driven.

Since the permanent magnet rotor assembly is secured solely to the aluminum center portion 14 of the composite shaft, no separate insulating sleeve is needed, because the shaft does not short circuit the magnetic circuit between the discs 15, 25.

It will be appreciated that the center portion of the shaft need not be aluminum but could be of any suitable nonmagnetic material. Moreover, the end bearing portions of the shaft need not be steel and could be any suitable bearing material.

We claim:

1. A rotor shaft for a dynamoelectric machine having a permanent magnet rotor assembly, comprising a pair of bearing portions which are spaced-apart by a separate central portion of nonmagnetic material, said being portion being secured to said central portion, and said central portion carrying said permanent magnet rotor assembly without the interposition of a nonmagnetic sleeve.

2. A dynamoelectric machine comprising a casing supporting stator windings and a pair of bearings, and a rotor shaft having a pair of bearing portions supported by said bearings respectively, and a central nonmagnetic portion having been secured to said bearing portions by friction welding and carrying a permanent magnet rotor assembly without the interposition of a nonmagnetic sleeve.

3. (An arrangement) A machine as claimed in (claim 1 or) claim 2 in which the bearing portions are steel.

4. (An arrangement) A machine as claimed in (any one of claims 1 to 3) claim 2 in which the central portion is aluminum.